US011837091B2

(12) United States Patent
Kato

(10) Patent No.: US 11,837,091 B2
(45) Date of Patent: Dec. 5, 2023

(54) SAFE DRIVING ASSIST APPARATUS FOR VEHICLE

(71) Applicant: TOYOTA JIDOSHA KABUSHIKI KAISHA, Toyota (JP)

(72) Inventor: Mitsuharu Kato, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 17/487,152

(22) Filed: Sep. 28, 2021

(65) Prior Publication Data

US 2022/0114890 A1 Apr. 14, 2022

(30) Foreign Application Priority Data

Oct. 12, 2020 (JP) .................................. 2020-171813

(51) Int. Cl.
*G08G 1/0967* (2006.01)
*G06V 20/58* (2022.01)

(52) U.S. Cl.
CPC ..... *G08G 1/096791* (2013.01); *G06V 20/582* (2022.01)

(58) Field of Classification Search
CPC ......... G08G 1/096791; G08G 1/09623; G08G 1/096716; G08G 1/096758; G08G 1/163; G06V 20/582; B60W 30/095; B60W 30/0953; B60W 40/00; B60W 40/02; B60W 50/14; B60W 2050/143; B60W 2050/146

See application file for complete search history.

(56) References Cited

U.S. PATENT DOCUMENTS

| 2011/0301844 | A1 | 12/2011 | Aono | |
|---|---|---|---|---|
| 2018/0253899 | A1* | 9/2018 | Schrepfer | ............. G06T 19/006 |
| 2020/0012295 | A1* | 1/2020 | Kim | .......................... G08G 1/22 |
| 2021/0180979 | A1 | 6/2021 | Kitahara | |
| 2021/0331699 | A1* | 10/2021 | Kim | ........................ G08G 1/202 |
| 2021/0334564 | A1* | 10/2021 | Park | ........................ G06F 18/24 |
| 2021/0394676 | A1* | 12/2021 | Kuoch | .................... H04L 67/12 |

FOREIGN PATENT DOCUMENTS

| CN | 102334147 A | 1/2012 |
|---|---|---|
| JP | 2008-015920 A | 1/2008 |
| JP | 2011-204150 A | 10/2011 |
| JP | 2018-077652 A | 5/2018 |
| JP | 2019-018852 A | 2/2019 |
| JP | 2020-038359 A | 3/2020 |

* cited by examiner

*Primary Examiner* — Behrang Badii
(74) *Attorney, Agent, or Firm* — Sughrue Mion, PLLC

(57) ABSTRACT

A safe driving assist apparatus includes an image processing ECU configured to determine whether or not a specific object exists forward of an own vehicle, a wireless communication apparatus configured to acquire information on a road sign recognized by another vehicle from the another vehicle through vehicle-to-vehicle communication, and a driving assist ECU configured to determine, based on information on a road sign detected by the own vehicle and the information on the road sign detected by the another vehicle, whether or not a specific condition indicating that a possibility of collision between the own vehicle and the another vehicle exists is satisfied, and to execute, when determining that the specific condition is satisfied, notification control of notifying a driver of the own vehicle that the possibility of collision between the own vehicle and the another vehicle exists.

8 Claims, 4 Drawing Sheets

SAFE DRIVING ASSIST APPARATUS FOR VEHICLE

BACKGROUND OF THE INVENTION

1. Field of the Invention

The present invention relates to a safe driving assist apparatus for a vehicle.

2. Description of the Related Art

In Japanese Patent Application Laid-open No. 2008-15920, there is disclosed a safe driving assist apparatus for a vehicle. The safe driving assist apparatus for a vehicle is configured to acquire, through vehicle-to-vehicle communication, positioning information on another vehicle (that is, a position of the another vehicle), which is based on radio waves of positioning satellites of the GNSS, and to determine a possibility of collision between an own vehicle and the another vehicle based on the acquired positioning information. However, the position (latitude, longitude, and altitude) of the vehicle estimated based on the positioning information obtained by the GNSS is not sufficiently accurate. When measurement accuracy of the longitude and the latitude of the vehicle is low, there is a fear in that the possibility of the collision between the own vehicle and the another vehicle may be erroneously determined. Moreover, when measurement accuracy of the altitude of the vehicle is low, even under a state without the possibility of the collision, such as a case in which the own vehicle and the another vehicle are traveling on different levels of a grade separation or a case in which the own vehicle and the another vehicle are traveling on an elevated road and a side road thereof, it may erroneously be determined that the possibility of the collision exists. As a result, there occurs a case in which unnecessary warning is generated.

SUMMARY OF THE INVENTION

The present invention has been made in view of the above-mentioned problem. That is, an object of the present invention is to provide a safe driving assist apparatus which increases accuracy of determination of whether or not there exists another vehicle requiring attention of an occupant of an own vehicle, thereby being capable of reducing a frequency of generation of unnecessary warning.

In order to solve the above-mentioned problem, according at least one embodiment of the present invention, there is provided a safe driving assist apparatus (100) for a vehicle, including: a camera (front camera (103)), which is mounted to an own vehicle (vehicle (10)), and is configured to acquire an image obtained by taking a forward view of the own vehicle (vehicle (10)); a wireless communication apparatus (107), which is mounted to the own vehicle (vehicle (10)), and is configured to transmit and receive information through vehicle-to-vehicle communication; a notification apparatus (display apparatus (105) and sound output apparatus (106)), which is mounted to the own vehicle, and is configured to generate a warning to an occupant of the own vehicle; and a control unit (driving assist ECU (101)), which is mounted to the own vehicle, and is connected to the camera, the wireless communication apparatus, and the notification apparatus. The control unit is configured to: detect, based on the image, a specific object which is defined in advance and is positioned forward of the own vehicle, and acquire specific object information being information on the specific object; transmit, through the wireless communication apparatus (107), predetermined communication information including the acquired specific object information to another vehicle in a vicinity of the own vehicle, and receive the predetermined communication information transmitted from "the wireless communication apparatus (107) of the safe driving assist apparatus mounted to the another vehicle" in the vicinity of the own vehicle; determine whether a specific condition is satisfied based on the specific object information acquired based on the image and on the specific object information included in the received predetermined communication information, the specific condition being defined in advance to be satisfied when another vehicle requiring attention of the occupant of the own vehicle exists; and generate the warning from the notification apparatus when the control unit determines that the specific condition is satisfied.

According at least one aspect of the present invention, the control unit is configured to acquire, as the specific object information, information on a road sign being the specific object.

According to at least one aspect of the present invention, the specific object information is acquired based on the image taken by the camera of the own vehicle, and the specific object information acquired based on the image taken by the camera of the another vehicle is acquired through the communication. After that, it is determined based on those pieces of the information whether or not there is satisfied the specific condition that is defined in advance to be satisfied when there exists another vehicle requiring the attention of the occupant of the own vehicle. Thus, according to at least one aspect of the present invention, compared with an apparatus that uses only positioning information provided by a GNSS apparatus to determine whether or not a possibility of collision between the own vehicle and the another vehicle exists, it is possible to increase accuracy of the determination of the relative positional relationship between the own vehicle and the another vehicle. Consequently, the frequency of generation of the unnecessary warning can be reduced. Further, according to at least one aspect of the present invention, a map system for precisely measuring the positions of the own vehicle and the another vehicle is not required. Thus, compared with an apparatus in which the use of the map system is assumed, the cost can be reduced.

According at least one aspect of the present invention, the control unit is configured to: acquire a position of the own vehicle based on radio wave signals from positioning satellites; and transmit, as the predetermined communication information, information including the acquired position of the own vehicle, and the control unit is further configured to determine, based on the acquired position of the own vehicle, the acquired information on the road sign, and the received predetermined communication information, that the specific condition is satisfied when the control unit determines that the following condition is satisfied: a distance between the own vehicle and the another vehicle is equal to or shorter than a first threshold value ("Yes" in Step S101); a travel direction difference is equal to or smaller than a second threshold value ("Yes" in Step S101), the travel direction difference being a magnitude of a difference in an angle formed between a travel direction of the own vehicle and a travel direction of the another vehicle; and an own-vehicle-recognized sign and an another-vehicle-recognized sign are the same ("Yes" in Step S105 to Step S108), the own-vehicle-recognized sign being a road sign included in the image acquired by the camera mounted to the own vehicle, the another-vehicle-recognized sign being a road sign included in the image acquired by the camera mounted to the another vehicle.

With this configuration, it is determined whether or not the own-vehicle-recognized sign and the another-vehicle-recognized sign are the same, and it is thus possible to accurately determine whether or not the own vehicle and the another vehicle are traveling in the same lane toward the same direction. As a result, it is possible to increase the accuracy of the determination of whether or not there exists another vehicle that is close to the own vehicle and is traveling in the same lane as the lane of the own vehicle toward the same direction as the direction of the own vehicle (that is, a following vehicle or a precising vehicle traveling at a position close to the own vehicle).

According at least one aspect of the present invention, the control unit is configured to: determine that the own-vehicle-recognized sign and the another-vehicle-recognized sign are the same when the control unit determines that: a type of the own-vehicle-recognized sign and a type of the another-vehicle-recognized sign are the same ("Yes" in Step S105); and a distance between the own-vehicle-recognized sign and the another-vehicle-recognized sign is equal to or shorter than a third threshold value ("Yes" in Step S106); and determine, in a case in which the control unit determines that the own-vehicle-recognized sign and the another-vehicle-recognized sign are the same, that the specific condition is satisfied when the control unit further determines that one of the following conditions are satisfied: a condition that a detection direction difference is equal to or smaller than a fourth threshold value, the detection direction difference being a magnitude of a difference in an angle formed between a direction of the own-vehicle-recognized sign with respect to the own vehicle and a direction of the another-vehicle-recognized sign with respect to the another vehicle; and a condition that the own-vehicle-recognized sign is located on any one side of a left side and a right side with respect to the travel direction of the own vehicle and the another-vehicle-recognized sign is located on any one side of a left side and a right side with respect to the travel direction of the another vehicle ("Yes" in Step S107).

According at least one aspect of the present invention, the control unit is configured to: determine, in the case in which the control unit determines that the own-vehicle-recognized sign and the another-vehicle-recognized sign are the same, that the specific condition is satisfied when the control unit further determines that a magnitude of a difference between a height of the own-vehicle-recognized sign and a height of the another-vehicle-recognized sign is equal to or smaller than a fifth threshold value ("Yes" in Step S108); and determine that, even in the case in which the control unit determines that the own-vehicle-recognized sign and the another-vehicle-recognized sign are the same, the specific condition is not satisfied when the control unit determines that the magnitude of the difference between the height of the own-vehicle-recognized sign and the height of the another-vehicle-recognized sign is larger than the fifth threshold value ("No" in Step S108).

According at least one aspect of the present invention, the control unit is configured to: acquire a position of the own vehicle based on radio wave signals from positioning satellites; and transmit, as the predetermined communication information, information including the acquired position of the own vehicle, and the control unit is further configured to determine, based on the acquired position of the own vehicle, the acquired information on the road sign, and the received predetermined communication information, that the specific condition is satisfied when the control unit determines that the following condition is satisfied: a distance between the own vehicle and the another vehicle is equal to or shorter than a sixth threshold value ("Yes" in Step S201); a travel direction difference is within a predetermined angle range including 180° ("Yes" in Step S201), the travel direction difference being a magnitude of a difference in an angle formed between a travel direction of the own vehicle and a travel direction of the another vehicle; and an own-vehicle-recognized sign and an another-vehicle-recognized sign are the same ("Yes" in Step S205 to Step S207), the own-vehicle-recognized sign being a road sign included in the image acquired by the camera mounted to the own vehicle, the another-vehicle-recognized sign being a road sign included in the image acquired by the camera mounted to the another vehicle.

With this configuration, it is determined whether or not the own-vehicle-recognized sign and the another-vehicle-recognized sign are the same, and it is thus possible to accurately determine whether or not the own vehicle and the another vehicle are traveling in the same lane toward the same direction. Thus, with this configuration, it is possible to increase the accuracy of the determination of whether or not there exists another vehicle (that is, an oncoming vehicle) that is close to the own vehicle and is traveling on the same road as the road of the own vehicle toward a direction close to the opposite direction of the direction of the own vehicle.

According at least one aspect of the present invention, the control unit is configured to: determine that the own-vehicle-recognized sign and the another-vehicle-recognized sign are the same when the control unit determines that: an outer peripheral shape of the own-vehicle-recognized sign and an outer peripheral shape of the another-vehicle-recognized sign are the same ("Yes" in Step S205); and a distance between the own-vehicle-recognized sign and the another-vehicle-recognized sign is equal to or shorter than an eighth threshold value ("Yes" in Step S206); and determine, in a case in which the control unit determines that the own-vehicle-recognized sign and the another-vehicle-recognized sign are the same, that the specific condition is satisfied when the control unit further determines that the following condition is satisfied: a magnitude of a difference between a height of the own-vehicle-recognized sign and a height of the another-vehicle-recognized sign is equal to or smaller than a ninth threshold value ("Yes" in Step S207).

According at least one aspect of the present invention, the control unit is configured to acquire, as the information on the road sign, a name of an intersection written on the road sign from the image taken by the camera mounted to the own vehicle, and the control unit is further configured to determine that the specific condition is satisfied when the control unit determines that the following condition is satisfied: the acquired name of the intersection and a name of an intersection included in the predetermined communication information are the same ("Yes" in Step S304).

When the own vehicle and the another vehicle are entering the same intersection, the cameras of those vehicles are often capturing road signs on which the name of the same intersection is written. Thus, with this configuration, it is possible to increase accuracy of the determination of whether or not there exists another vehicle approaching the same intersection as the intersection of the own vehicle. In particular, when the own vehicle and the another vehicle are traveling on different levels of a grade separation, it is possible to reduce a frequency of a case in which "the own vehicle and the another vehicle are erroneously determined to be approaching the same intersection, and as a result, warning is generated."

In the above description, for easier understanding of the present invention, the terms and/or reference symbols used in embodiments described later are enclosed in parentheses and assigned to the components of the present invention corresponding to the embodiments. However, the constituent elements of the present invention are not limited to the embodiments defined by the terms and/or reference symbols.

DESCRIPTION OF THE EMBODIMENTS

Description is now given of a safe driving assist apparatus 100 for a vehicle according to each embodiment of the present invention. In the following description, the safe driving assist apparatus 100 for a vehicle according to each embodiment may be abbreviated as "assist apparatus 100". The assist apparatus 100 is mounted to a vehicle 10. The assist apparatus 100 mounted to an own vehicle wirelessly communicates (executes so-called "vehicle-to-vehicle communication") to/from the assist apparatus 100 mounted to another vehicle, to thereby mutually transmit and receive predetermined information. In the following description, a vehicle communicating to/from the own vehicle through the established vehicle-to-vehicle communication is referred to as "communication vehicle". When a simple description of "vehicle 10" is given, the vehicle 10 refers to one of the own vehicle and the communication vehicle (another vehicle). Further, information to be mutually transmitted and received is referred to as "communication information".

First Embodiment

Figure 1:
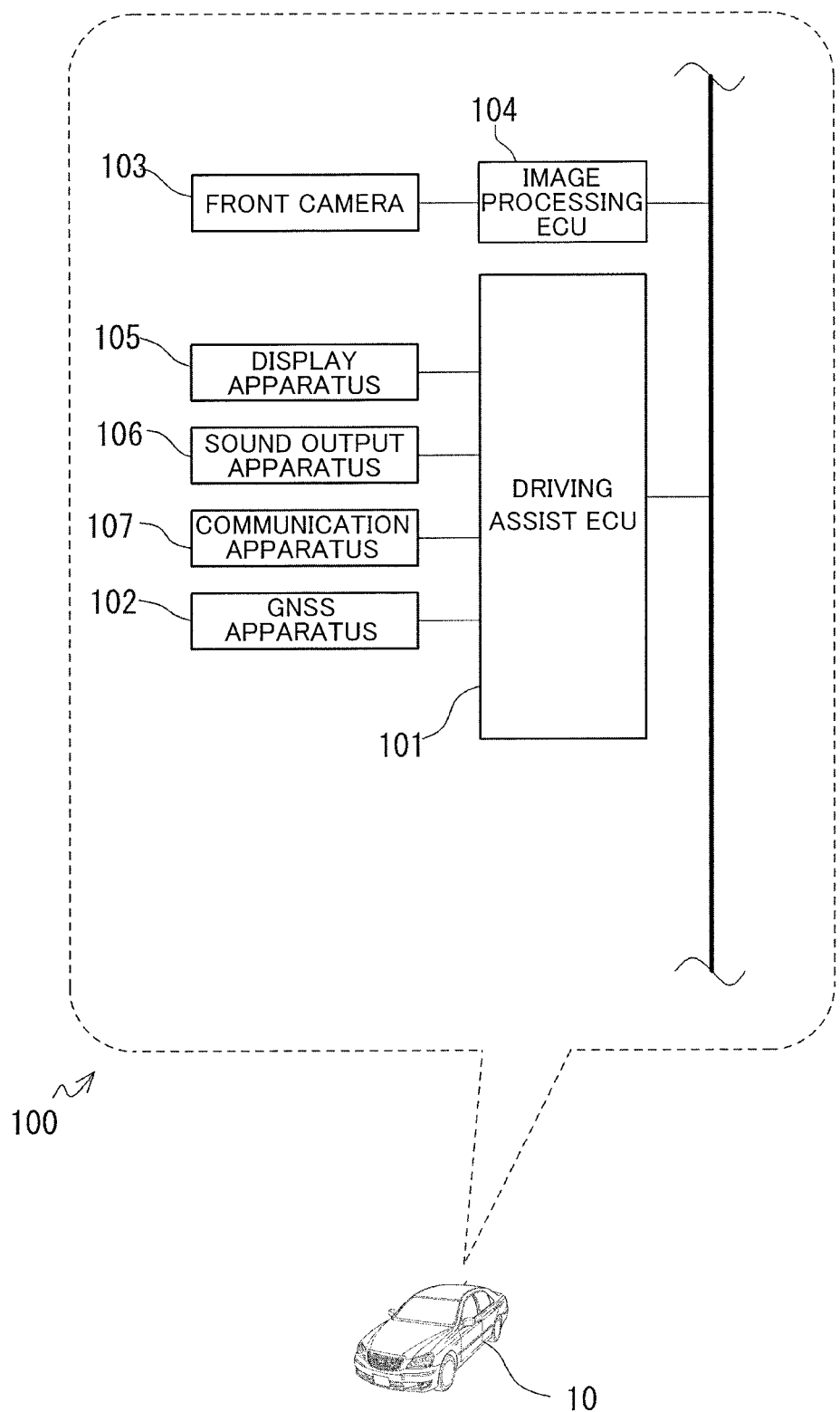
FIG. 1 is a diagram for illustrating a configuration of a vehicle.

As illustrated in FIG. 1, the assist apparatus 100 includes a driving assist ECU 101, a GNSS apparatus 102, a front camera 103, an image processing ECU 104, a display apparatus 105, a sound output apparatus 106, and a wireless communication apparatus 107. Each of the driving assist ECU 101 and the image processing ECU 104 includes a computer including a CPU, a ROM, and a RAM. The driving assist ECU 101 and the image processing ECU 104 are connected so as to be capable of mutually transmitting and receiving signals through a controller area network (CAN). The CPU of each of the driving assist ECU 101 and the image processing ECU 104 is configured to read out and execute instructions (programs and routines) stored in the ROM, to thereby achieve various types of functions. The driving assist ECU 101 and the image processing ECU 104 may be unified to one ECU, or may be formed of three or more ECUs.

The driving assist ECU 101 is a central control apparatus for executing driving assist for a driver, and executes collision avoidance assist control. The driving assist ECU 101 is connected to the GNSS apparatus 102, the display apparatus 105, the sound output apparatus 106, and the wireless communication apparatus 107. The driving assist ECU 101 is configured to transmit a display command to the display apparatus 105, to thereby be capable of causing the display apparatus 105 to display a predetermined image, and to transmit a sound output command to the sound output apparatus 106, to thereby be capable of causing the sound output apparatus 106 to output predetermined sound. Further, the driving assist ECU 101 is configured to transmit a communication command to the wireless communication apparatus 107, to thereby be capable of transmitting and receiving the communication information between the wireless communication apparatus 107 of the own vehicle and the wireless communication apparatus 107 of the assist apparatus 100 mounted to another vehicle.

The GNSS apparatus 102 receives radio waves transmitted by positioning satellites, sequentially measures the current position (longitude, latitude, and altitude) of the vehicle based on the received radio waves, and identifies the travel direction of the vehicle 10 (that is, the direction of the vehicle 10) based on a change in the position. After that, the GNSS apparatus 102 sequentially transmits the measured position and travel direction of the vehicle to the driving assist ECU 101.

The display apparatus 105 is configured to display an image (including graphics, characters, and symbols) based on the display command from the driving assist ECU 101. The display apparatus 105 displays the image, to thereby be capable of providing various types of information to the driver. The display apparatus 105 can display, for example, a 2D image in full color, and can be formed of a liquid crystal display, an organic EL display, a plasma display, or the like.

The sound output apparatus 106 is configured to be capable of outputting sound based on a sound output command from the driving assist ECU 101. Specifically, the sound output apparatus 106 includes an amplifier and a speaker (loudspeaker).

The front camera 103 sequentially (for example, at a cycle of 100 msec) captures a scene forward of the vehicle, generates images (image data representing the images), and sequentially transmits the generated image data to the image processing ECU 104. "Forward" in a first embodiment of the present invention includes not only a front direction of the vehicle, but also an obliquely front upper side, an obliquely front lower side, an obliquely front right side, and an obliquely front left side.

The image processing ECU 104 detects, by publicly-known image recognition processing, a specific object that is defined in advance and exists forward of the own vehicle. In other words, the image processing ECU 104 applies the publicly-known image recognition processing to the image data sequentially transmitted from the front camera 103, to thereby determine whether or not there exists a specific object forward of the own vehicle. In the first embodiment, the image processing ECU 104 detects a road sign (that is, determines whether or not a road sign exists) as the specific object defined in advance.

After that, when the image processing ECU 104 detects a road sign, the image processing ECU 104 recognizes a type (specifically, a display content of the road sign) of the detected road sign. A publicly-known method such as pattern matching or the Hough transform can be applied to the processing of recognizing the type of the road sign. Specifically, the image processing ECU 104 applies publicly-known image processing such as edge detection to the image data acquired from the front camera 103, to thereby extract contours of all of objects included in the image. After that, the image processing ECU 104 uses templates prepared in advance to apply pattern matching processing to the image data subjected to the image processing, to thereby recognize the type of the road sign. The type of the road sign to be recognized may be a type (type of information that relates to the travel of the vehicle, and is to be transmitted to the driver) such as a maximum speed limit, a no-passing zone, a steep curve ahead, and a travel surface inclination.

Further, when the image processing ECU 104 detects a road sign, the image processing ECU 104 calculates the distance from the own vehicle to the road sign, a direction of the existence of the road sign as viewed from the own vehicle (orientation in the right and left direction with respect to the axis of the front and rear direction of the own vehicle), and the height of the road sign with respect to a predetermined reference position set to the same height from the road surface with respect to the own vehicle and the another vehicle (for example, the height from the road surface on which the own vehicle exists to the road sign. This height is hereinafter simply referred to as "height of road sign"). Specifically, the image processing ECU 104 calculates the distance from the own vehicle to the road sign based on the size of the road sign appearing in the image taken by the front camera 103. That is, the image processing ECU 104 calculates the distance from the own vehicle to the road sign based on a ratio of the dimensions (or the number of pixels) in the vertical direction and the horizontal direction of the road sign appearing in the image to the dimensions (or the number of pixels) in the vertical direction and the horizontal direction of the entire image. The image processing ECU 104 calculates the direction of the existence of the road sign as viewed from the own vehicle and the height of the road sign based on the distance from the own vehicle to the road sign and the position of the road sign in the image taken by the front camera 103. "A road sign detected by the image processing ECU 104 of the assist apparatus 100 of the own vehicle" is hereinafter referred to as "own-vehicle-detected sign". "A road sign detected by the image processing ECU 104 of the assist apparatus 100 of the communication vehicle (another vehicle)" is referred to as "another-vehicle-detected sign".

The wireless communication apparatus 107 searches for, based on the communication command transmitted from the driving assist ECU 101, another vehicle (assist apparatus 100 mounted to the another vehicle in a strict sense) that exists in a vicinity (in a vehicle-to-vehicle communicative range) of the own vehicle and can execute the vehicle-to-vehicle communication to/from the own vehicle. After that, when the wireless communication apparatus 107 detects another vehicle that can execute the vehicle-to-vehicle communication to/from the own vehicle, the wireless communication apparatus 107 establishes the vehicle-to-vehicle communication to/from the another vehicle. The wireless communication apparatus 107 sequentially transmits and receives the communication information to/from the wireless communication apparatus 107 of the assist apparatus 100 mounted to the another vehicle (communication vehicle) to/from which the vehicle-to-vehicle communication is established.

The driving assist ECU 101 executes the collision avoidance assist control. More specifically, the driving assist ECU 101 uses the information acquired through the vehicle-to-vehicle communication to/from the communication vehicle to determine whether or not a specific condition is satisfied. The specific condition is a condition that is satisfied when the acquired information indicates that a possibility of collision between the own vehicle and the communication vehicle exists (that is, there exists a communication vehicle requiring a particular attention of the driver of the own vehicle). When the driving assist ECU 101 determines that the specific condition is satisfied, the driving assist ECU 101 notifies the fact that the specific condition is satisfied (the possibility of the collision exists) to the driver of the own vehicle. The collision avoidance assist control has been summarized above.

The specific condition in the first embodiment is defined to be satisfied when there exists "a communication vehicle having a short distance from the own vehicle (having a distance equal to or shorter than a first threshold value) and traveling in the same lane as the lane of the own vehicle toward approximately the same direction as the traveling direction of the own vehicle." In other words, the specific condition in the first embodiment is defined to be satisfied when there exists "a preceding vehicle or a following vehicle existing at a position close to the own vehicle and traveling in the same lane of a road as the lane of the own vehicle toward the same direction as the direction of the own vehicle."

The driving assist ECU 101 transmits the communication command to the wireless communication apparatus 107, to thereby cause the wireless communication apparatus 107 of the own vehicle and the wireless communication apparatus 107 of the communication vehicle to sequentially transmit and receive the communication information as a part of the collision avoidance assist control. The communication information mutually transmitted and received by the wireless communication apparatus 107 through the vehicle-to-vehicle communication includes specific object information (information on road signs in the first embodiment) being information on the specific objects. In the first embodiment, the specific object information includes the type of a road sign recognized by the image processing ECU 104, the direction of the existence of the road sign as viewed from the vehicle 10, the distance from the vehicle 10 to the road sign, and the height of the road sign. Further, the communication information other than the specific object information includes the position (longitude, latitude, and altitude) of the vehicle 10 and the travel direction of the vehicle 10 (that is, the direction of the vehicle 10) measured by the GNSS apparatus 102. The travel direction of the vehicle 10 is calculated from the temporal change in the position of the vehicle 10. Thus, the driving assist ECU 101 of the assist apparatus 100 of the own vehicle sequentially acquires the position and the travel direction of the communication vehicle. Further, when the image processing ECU 104 of the assist apparatus 100 of the communication vehicle detects a road sign (another-vehicle-detected sign), the driving assist ECU 101 of the assist apparatus 100 of the own vehicle sequentially acquires the type of the another-vehicle-detected sign, the direction of the existence of the another-vehicle-detected sign as viewed from the communication vehicle, the distance from the communication vehicle to the another-vehicle-detected sign, and the height of the another-vehicle-detected sign.

The driving assist ECU 101 first determines whether or not the communication vehicle is traveling at a position close to the own vehicle toward a direction close to the travel direction of the own vehicle. Specifically, the driving assist ECU 101 calculates the distance between the own vehicle and the communication vehicle based on the position of the own vehicle measured by the GNSS apparatus 102 of the safe driving assist apparatus 100 of the own vehicle and the position of the communication vehicle received through the vehicle-to-vehicle communication. After that, the driving assist ECU 101 determines whether or not the distance is equal to or shorter than the first threshold value. Further, the driving assist ECU 101 calculates a magnitude of a difference in an angle formed between the travel direction of the own vehicle and the travel direction of the communication vehicle acquired through the vehicle-to-vehicle communication (hereinafter also referred to as "travel direction difference"). After that, the driving assist ECU 10 determines whether or not the travel direction difference is equal to or smaller than a second threshold value. When the driving assist ECU 101 determines that the distance between the own vehicle and the communication vehicle is equal to or shorter than the first threshold value and the travel direction difference between the travel direction of the own vehicle and the travel direction of the communication vehicle is equal to or smaller than the second threshold value, the driving assist ECU 101 determines that the communication vehicle is traveling at a position close to the own vehicle toward a direction close to the travel direction of the own vehicle. The driving assist ECU 101 repeats this determination each time a predetermined period elapses while the vehicle-to-vehicle communication to/from the communication vehicle is established.

In addition, when the image processing ECU 104 of the own vehicle detects an own-vehicle-detected sign, and the image processing ECU 104 of the communication vehicle detects an another-vehicle-detected sign, the driving assist ECU 101 determines whether or not the type of the own-vehicle-detected sign and the type of the another-vehicle-detected sign are the same. Further, in this case, the driving assist ECU 101 determines whether or not the position of the own-vehicle-detected sign and the position of the another-vehicle-detected sign are close to each other. Specifically, the driving assist ECU 101 collates the type of the own-vehicle-detected sign recognized by the driving assist ECU 101 of the own vehicle and the type of the another-vehicle-detected sign acquired through the vehicle-to-vehicle communication with each other, to thereby determine whether or not the type of the own-vehicle-detected sign and the type of the another-vehicle-detected sign are the same. Further, the driving assist ECU 101 calculates the position (longitude and latitude) of the own-vehicle-detected sign based on the position of the own vehicle, the distance from the own vehicle to the own-vehicle-detected sign, and the direction of the existence of the own-vehicle-detected sign as viewed from the own vehicle. Similarly, the driving assist ECU 101 calculates the position of the another-vehicle-detected sign based on the position of the communication vehicle, the travel direction of the communication vehicle, the distance from the communication vehicle to the another-vehicle-detected sign, and the direction of the existence of the another-vehicle-detected sign as viewed from the communication vehicle acquired from the communication vehicle through the vehicle-to-vehicle communication.

When the vehicle 10 is traveling, the position of the vehicle 10 and the distance from the vehicle 10 to the road sign change moment by moment. Consequently, the driving assist ECU 101 is only required to calculate the position of the vehicle 10 and the distance from the vehicle 10 to the road sign at one timing in a period from entrance of the road sign into the image taken by the front camera 103 to exit of the road sign from the image.

After that, the driving assist ECU 101 obtains the distance between the own-vehicle-detected sign and the another-vehicle-detected sign based on the position of the own-vehicle-detected sign and the position of the another-vehicle-detected sign, and determines whether or not the distance (detected inter-sign distance) is equal to or shorter than a third threshold value. When the driving assist ECU 101 determines that the distance (detected inter-sign distance) is equal to or shorter than the third threshold value, the driving assist ECU 101 determines that the position of the own-vehicle-detected sign and the position of the another-vehicle-detected sign are close to each other. After that, when the driving assist ECU 101 determines that the type of the own-vehicle-detected sign and the type of the another-vehicle-detected sign are the same, and the distance between the own-vehicle-detected sign and the another-vehicle-detected sign is equal to or shorter than the third threshold value, that is, determines that those same-sign conditions are satisfied, the driving assist ECU 101 determines that the own-vehicle-detected sign and the another-vehicle-detected sign are the same object (that is, the same road sign).

The respective timings at which the own vehicle and the communication vehicle detect the same road sign are not always the same. Thus, even when the timing at which the road sign is detected by the image processing ECU 104 of the own vehicle and the timing at which the road sign detected by the image processing ECU 104 of the communication vehicle are different from each other, but when a difference between those timings is equal to or smaller than a threshold value, the driving assist ECU 101 determines whether or not the own-vehicle-detected sign and the another-vehicle-detected sign are the same object.

In order to enable such a determination, the driving assist ECU 101 stores, in the RAM for a predetermined period, the position of the own vehicle measured by the GNSS apparatus 102 of the assist apparatus 100 of the own vehicle, the type of the own-vehicle-detected sign recognized by the image processing ECU 104, the calculated position of the own-vehicle-detected sign, the calculated travel direction of the own vehicle, the calculated direction of the own-vehicle-detected sign as viewed from the own vehicle, and the calculated height of the own-vehicle-detected sign. Similarly, the driving assist ECU 101 stores, in the RAM for a predetermined period, the position of the communication vehicle, the travel direction of the communication vehicle, the type of the another-vehicle-detected sign, the direction of the another-vehicle-detected sign as viewed from the communication vehicle, and the height of the another-vehicle-detected sign which are acquired through the vehicle-to-vehicle communication. For example, the driving assist ECU 101 stores and deletes those pieces of information in and from the RAM in a FIFO manner. The driving assist ECU 101 uses the information stored in the RAM to make the above-mentioned determination.

When the driving assist ECU 101 determines that the own-vehicle-detected sign and the another-vehicle-detected sign are the same object, the driving assist ECU 101 determines whether or not the direction of the own-vehicle-detected sign as viewed from the own vehicle and the direction of the another-vehicle-detected sign as viewed from the communication vehicle are close to each other. Specifically, the driving assist ECU 101 calculates the magnitude of the difference in angle (hereinafter also referred to as "detection direction difference") formed between the direction of the own-vehicle-detected sign as viewed from the own vehicle and the direction of the another-vehicle-detected sign as viewed from the communication vehicle. When the driving assist ECU 101 determines that the detection direction difference is equal to or smaller than a fourth threshold value, the driving assist ECU 101 determines that the direction of the own-vehicle-detected sign as viewed from the own vehicle and the direction of the another-vehicle-detected sign as viewed from the communication vehicle are close to each other. When the own-vehicle-detected sign is detected on any one side (hereinafter referred to as "specific side") of the left side and the right side of the own vehicle, and the another-vehicle-detected sign is detected on the specific side of the left side and the right side of the communication vehicle, the driving assist ECU 101 may determine that the direction of the own-vehicle-detected sign as viewed from the own vehicle and the direction of the another-vehicle-detected sign as viewed from the communication vehicle are close to each other. That is, when there occurs any one of a case in which the own-vehicle-detected sign is detected on the left side of the own vehicle and the another-vehicle-detected sign is detected on the left side of the communication vehicle and a case in which the own-vehicle-detected sign is detected on the right side of the own vehicle and the another-vehicle-detected sign is detected on the right side of the communication vehicle, the driving assist ECU 101 may determine that the direction of the own-vehicle-detected sign as viewed from the own vehicle and the direction of the another-vehicle-detected sign as viewed from the communication vehicle are close to each other.

Further, the driving assist ECU 101 determines whether or not the height of the own-vehicle-detected sign and the height of the another-vehicle-detected sign are close to each other. Specifically, the driving assist ECU 101 calculates the height of the own-vehicle-detected sign from the position of the road sign in the image taken by the front camera 103 and the distance between the own vehicle and the own-vehicle-detected sign. Moreover, the driving assist ECU 101 acquires the height of the another-vehicle-detected sign through the vehicle-to-vehicle communication. After that, the driving assist ECU 101 determines whether or not the magnitude of a difference (hereinafter also referred to as "height difference") between the height of the own-vehicle-detected sign and the height of the another-vehicle-detected sign is equal to or smaller than a fifth threshold value. When the driving assist ECU 101 determines that the height difference is equal to or smaller than the fifth threshold value, the driving assist ECU 101 determines that the height of the own-vehicle-detected sign and the height of the another-vehicle-detected sign are close to each other.

When the direction of the own-vehicle-detected sign as viewed from the own vehicle and the direction of the another-vehicle-detected sign as viewed from the communication vehicle are close to each other, and the height of the own-vehicle-detected sign and the height of the another-vehicle-detected sign are close to each other, the driving assist ECU 101 determines that the own vehicle and the communication vehicle are traveling in the same lane toward the same direction. After that, when the driving assist ECU 101 determines that the own vehicle and the communication vehicle are traveling in the same lane toward the same direction, the driving assist ECU 101 determines that the specific condition is satisfied.

When the driving assist ECU 101 determines that the specific condition is satisfied, the driving assist ECU 101 transmits the display command to the display apparatus 105, and transmits the sound output command to the sound output apparatus 106. The display apparatus 105 displays a predetermined image in accordance with the display command from the driving assist ECU 101. The sound output apparatus 106 outputs predetermined sound in accordance with the sound output command from the driving assist ECU 101.

Consequently, the existence of "the another vehicle that is close to the own vehicle and is traveling in the same lane as the lane of the own vehicle toward the direction close to the travel direction of the own vehicle" is notified to the driver. Meanwhile, when the driving assist ECU 101 determines that the specific condition is not satisfied (determines that the own vehicle and the communication vehicle are not traveling in the same lane), the driving assist ECU 101 does not execute such operations. "The control of causing the display apparatus to display the predetermined image" and "the control of causing the sound output apparatus to output the predetermined sound" of the collision avoidance assist control are referred to as "notification control".

As described above, the specific object information (for example, the information on the road sign) is used for the determination of whether or not the specific condition is satisfied, thereby being capable of increasing accuracy of the determination of whether or not there exists "another vehicle traveling in a vicinity of the own vehicle in the same lane of the same road as the lane of the road of the own vehicle." For example, when the own vehicle is traveling on a main road and the communication vehicle is traveling on a side road parallel with the main road, and the accuracy of the measurement of the position of the vehicle 10 by the GNSS apparatus 102 is not sufficiently high, there is a fear in that the driving assist ECU 101 may erroneously determine that the own vehicle and the communication vehicle are traveling in the same lane (for example, the lane of the main road). Moreover, when one of the own vehicle and the communication vehicle is traveling on an elevated road, another one thereof is traveling on a road under the elevated road, and accuracy of the measurement of the altitude by the GNSS apparatus 102 is not sufficiently high, there is a fear in that the driving assist ECU 101 may erroneously determine that the own vehicle and the communication vehicle are traveling in the same lane (for example, a lane of the elevated road) toward the same direction. After that, when the notification control is executed based on the erroneous determination, the driver may be bothered by the operations of the display apparatus and the sound output apparatus. In contrast, according to the first embodiment, the specific object information is used, and it is thus possible to increase the accuracy of the determination of the relative positional relationship between the own vehicle and the communication vehicle. As a result, a frequency of the erroneous execution of the notification control can be reduced.

For example, it is assumed that one of the own vehicle and the communication vehicle is traveling on a main road, and another one thereof is traveling on a side road parallel with the main road. Under this state, when both of the own vehicle and the communication vehicle detect the same road sign installed between the main road and the side road, any one of the left direction and the right direction of the road sign (that is, the own-vehicle-detected sign) as viewed from the own vehicle and any one of the left direction and the right direction of the road sign (that is, the another-vehicle-detected sign) as viewed from the communication vehicle are different from each other. That is, in this case, the direction of the own-vehicle-detected sign as viewed from the own vehicle and the direction of the another-vehicle-detected sign as viewed from the communication vehicle are opposite to each other in the left-and-right direction. Thus, the magnitude of the difference in angle (that is, the detection direction difference) formed between the direction of the own-vehicle-detected sign as viewed from the own vehicle and the direction of the another-vehicle-detected sign as viewed from the communication vehicle is larger than the fourth threshold value. Consequently, it is possible to increase the accuracy of the determination of whether or not the specific condition is satisfied by determining whether or not the magnitude of the difference in angle (that is, the detection direction difference) formed between the direction of the own-vehicle-detected sign as viewed from the own vehicle and the direction of the another-vehicle-detected sign as viewed from the communication vehicle is equal to or smaller than the fourth threshold value.

As described above, according to the first embodiment, it is not required to build a highly accurate map system in order to increase the accuracy of the determination of whether or not the specific condition is satisfied. In addition, the assist apparatus 100 can be formed without adding a special apparatus to a related-art assist apparatus that uses the vehicle-to-vehicle communication and the front camera 103. As a result, it is possible to reduce, without inducing an increase in cost of the assist apparatus 100, the frequency of the erroneous execution of the notification control.

Description is now given of a specific operation of the driving assist ECU 101. The CPU of the driving assist ECU 101 of the own vehicle is hereinafter simply referred to as "CPU". The CPU searches for another vehicle that exists around the own vehicle and is capable of executing the vehicle-to-vehicle communication. When the CPU detects another vehicle capable of executing the vehicle-to-vehicle communication, the CPU establishes the vehicle-to-vehicle communication to/from the another vehicle. When the vehicle-to-vehicle communication is established between the own vehicle and the another vehicle, the CPU repeats a routine represented by a flowchart of FIG. 2. When there exist a plurality of other vehicles (communication vehicles) to/from each of which the vehicle-to-vehicle communication is established, the CPU executes the routine for each of the other vehicles.

In Step S101, the CPU determines whether or not a communication vehicle exists close to the own vehicle, and the communication vehicle is traveling toward a direction close to the travel direction of the own vehicle. Specifically, the CPU determines whether or not the distance between the own vehicle and the communication vehicle is equal to or shorter than the first threshold value, and whether or not the travel direction difference between the travel direction of the own vehicle and the travel direction of the communication vehicle is equal to or smaller than the positive second threshold value (for example, 10°) smaller than 90°. When the distance between the own vehicle and the communication vehicle is longer than the first threshold value, the CPU makes a determination of "No" in Step S101, and proceeds to Step S102. Similarly, when the travel direction difference is larger than the second threshold value, the CPU makes the determination of "No" in Step S101, and proceeds to Step S102. In Step S102, the CPU determines that "the communication vehicle is not traveling in the same lane as the lane of the own vehicle," and temporarily finishes this routine. Thus, in this case, the notification control is not executed.

When the CPU determines in Step S101 that the distance between the own vehicle and the communication vehicle is equal to or shorter than the first threshold value, and the travel direction difference between the own vehicle and the communication vehicle is equal to or smaller than the second threshold value, the CPU proceeds to Step S103.

In Step S103, the CPU determines whether or not the own vehicle has detected a road sign (own-vehicle-detected sign), and whether or not the specific object information is acquired from the communication vehicle (that is, whether or not the communication vehicle has detected an another-vehicle-detected sign being a road sign). When at least one of the own vehicle or the communication vehicle has not detected a road sign, the CPU proceeds to Step S102. Meanwhile, when both of the own vehicle and the communication vehicle have detected road signs, the CPU proceeds to Step S104.

In Step S104, the CPU calculates the position of the own-vehicle-detected sign based on the position of the own vehicle and the travel direction of the own vehicle measured by the GNSS apparatus 102 of the own vehicle and the distance from the own vehicle to the own-vehicle-detected sign and the direction of the own-vehicle-detected sign as viewed from the own vehicle calculated by the image processing ECU 104. Further, the CPU calculates the position of the another-vehicle-detected sign based on the position of the communication vehicle, the travel direction of the communication vehicle, the distance from the communication vehicle to the another-vehicle-detected sign, and the direction of the another-vehicle-detected sign as viewed from the communication vehicle which are acquired through the vehicle-to-vehicle communication. After that, the CPU proceeds to Step S105.

In Step S105, the CPU determines whether or not the type of the own-vehicle-detected sign and the type of the another-vehicle-detected sign are the same as each other. When, for example, the own-vehicle-detected sign is a sign indicating that the maximum speed is 80 km/h, and the another-vehicle-detected sign is a sign indicating that the maximum speed is 40 km/h, the CPU determines that the types of those signs are different from each other. When the type of the own-vehicle-detected sign and the type of the another-vehicle-detected sign are different from each other, the CPU makes a determination of "No" in Step S105, and proceeds to Step S102. Meanwhile, when the type of the own-vehicle-detected sign and the type of the another-vehicle-detected sign are the same, the CPU makes a determination of "Yes" in Step S105, and proceeds to Step S106. For example, when the own-vehicle-detected sign is a sign indicating that the maximum speed is 80 km/h, and the another-vehicle-detected sign is a sign indicating that the maximum speed is 80 km/h, the CPU determines that the types of those signs are the same as each other, and proceeds to Step S106.

In Step S106, the CPU determines whether or not the position of the own-vehicle-detected sign and the position of the another-vehicle-detected sign calculated in Step S104 are close to each other. Specifically, the CPU calculates the distance between the own-vehicle-detected sign and the another-vehicle-detected sign, and determines whether or not the distance is equal to or shorter than the third threshold value. When the distance is longer than the predetermined third threshold value, there is a high possibility that the own-vehicle-detected sign and the another-vehicle-detected sign are not the same object, and the CPU thus makes a determination of "No" in Step S106, and proceeds to Step S102. Meanwhile, when the distance is equal to or shorter than the third threshold value, the CPU makes a determination of "Yes" in Step S106, and proceeds to Step S107.

In Step S107, the CPU determines whether or not the direction of the own-vehicle-detected sign as viewed from the own vehicle and the direction of the another-vehicle-detected sign as viewed from the communication vehicle are close to each other. Specifically, the CPU calculates the difference (that is, detection direction difference) between "the direction of the own-vehicle-detected sign as viewed from the own vehicle" calculated by the image processing ECU 104 of the own vehicle and "the direction of the another-vehicle-detected sign as viewed from the communication vehicle" acquired through the vehicle-to-vehicle communication. After that, the CPU determines whether or not the detection direction difference is equal to or smaller than the fourth threshold value. When the detection direction difference is larger than the fourth threshold value, the CPU makes a determination of "No" in Step S107, and proceeds to Step S102. Meanwhile, when the detection direction difference is equal to or smaller than the fourth threshold value, the CPU makes a determination of "Yes" in Step S107, and proceeds to Step S108.

In Step S108, the CPU determines whether or not the height of the own-vehicle-detected sign and the height of the another-vehicle-detected sign are close to each other. Specifically, the CPU determines whether or not the magnitude of the difference in height (height difference) therebetween is equal to or smaller than the fifth threshold value. After that, when the difference in height is larger than the fifth threshold value, the CPU makes a determination of "No" in Step S108, and proceeds to Step S102. Meanwhile, when the height difference is equal to or smaller than the fifth threshold value, the CPU makes a determination of "Yes" in Step S108, and proceeds to Step S109.

In Step S109, the CPU determines that the own vehicle and the communication vehicle are traveling in the same lane toward the same direction, and sets the value of a first flag to "1" so as to indicate this state. As described above, in this routine, the CPU determines that the own vehicle and the communication vehicle are traveling in the same lane toward the same direction when the position of the own vehicle and the position of the communication vehicle are close to each other ("Yes" in Step S101), the own-vehicle-detected sign and the another-vehicle-detected sign are the same object ("Yes" in Step S105 and "Yes" in Step S106), the direction of the own-vehicle-detected sign as viewed from the own vehicle and the direction of the another-vehicle-detected sign as viewed from the communication vehicle are substantially the same ("Yes" in Step S107), and the magnitude of the difference between the height of the own-vehicle-detected sign and the height of the another-vehicle-detected sign is equal to or smaller than the fifth threshold value ("Yes" in Step S108). That is, the CPU determines that "the specific condition indicating that the possibility of collision between the own vehicle and the another vehicle exists" is satisfied. After that, the CPU proceeds to Step S110. In Step S110, the CPU executes the notification processing.

In the first embodiment, it is determined whether or not the height of the own-vehicle-detected sign and the height of the another-vehicle-detected sign are close to each other, but this determination is not required to be made. That is, Step S108 in the above-mentioned routine may be omitted.

Moreover, in the first embodiment, the driving assist ECU 101 of the own vehicle calculates the position of the another-vehicle-detected sign based on the communication information acquired through the vehicle-to-vehicle communication, but the processing is not limited to this example. For example, the wireless communication apparatus 107 may mutually transmit and receive the position of the road sign calculated by the driving assist ECU 101 through the vehicle-to-vehicle communication. In this case, the driving assist ECU 101 of the own vehicle determines whether or not the position of the own-vehicle-detected sign and the position of the another-vehicle-detected sign are close to each other based on the position of the own-vehicle-detected sign calculated by the driving assist ECU 101 itself and the position of the another-vehicle-detected sign acquired through the vehicle-to-vehicle communication.

Further, in the first embodiment, the image taken by the front camera 103 is used to calculate the distance from the vehicle 10 to the road sign, but the method of acquiring the distance is not limited to this example. For example, the assist apparatus 100 may further include a distance measurement apparatus, for example, a millimeter wave radar, and may use the distance measurement apparatus to measure the distance from the vehicle 10 to the road sign.

In addition, the order from Step S105 to Step S108 of the routine is not limited to the above-mentioned example. That is, it is only required that the driving assist ECU 101 be configured to determine that the specific condition is satisfied when all of the following condition (1a) to condition (1f) are satisfied, and to then execute the notification control. The specific condition in the first embodiment is also referred to as "first specific condition" for the convenience of description.

(1a) The own vehicle and the communication vehicle are close to each other.

(1b) The travel direction of the own vehicle and the travel direction of the communication vehicle are close to each other.

(1c) The type of the own-vehicle-detected sign and the type of the another-vehicle-detected sign are the same.

(1d) The position of the own-vehicle-detected sign and the position of the another-vehicle-detected sign are close to each other.

(1e) The direction of the own-vehicle-detected sign as viewed from the own vehicle and the direction of the another-vehicle-detected sign as viewed from the communication vehicle are close to each other.

(1f) The height of the own-vehicle-detected sign and the height of the another-vehicle-detected sign are close to each other.

Further, in the first embodiment, it is determined whether or not the type of the own-vehicle-detected sign and the type of the another-vehicle-detected sign are the same based on whether or not the content displayed on the own-vehicle-detected sign and the content displayed on the another-vehicle-detected sign are the same, but the configuration is not limited to this example. For example, when the shape of the own-vehicle-detected sign and the shape of the another-vehicle-detected sign are the same as or similar to each other, it may be determined that the type of the own-vehicle-detected sign and the type of the another-vehicle-detected sign are the same as each other. Moreover, when the own-vehicle-detected sign and the another-vehicle-detected sign are road signs for enforcing the maximum speed, it is not required to determine whether or not the maximum speed written on the own-vehicle-detected sign and the maximum speed written on the another-vehicle-detected sign are the same as each other. That is, when the own-vehicle-detected sign and the another-vehicle-detected sign are road signs for enforcing the maximum speeds, it may be determined that the type of the own-vehicle-detected sign and the type of the another-vehicle-detected sign are the same regardless of the maximum speeds written on the respective road signs. Similarly, when the own-vehicle-detected sign and the another-vehicle-detected sign are road signs for enforcing travel directions (that is, signs permitting proceeding toward only designated directions), it may be determined that the type of the own-vehicle-detected sign and the type of the another-vehicle-detected sign are the same regardless of the designated proceeding directions written on the respective road signs (or without determining the designated proceeding directions written on the respective road signs). Those methods can reduce a load of the processing on the CPU of the driving assist ECU 101.

Second Embodiment

The assist apparatus 100 according to a second embodiment of the present invention determines whether or not there exists "another vehicle (oncoming vehicle) close to the own vehicle" traveling toward a direction close to an opposite direction of the travel direction of the own vehicle on the same road as the road of the own vehicle. When such another vehicle exists, the assist apparatus 100 determines that the specific condition is satisfied, and executes the notification control. The configuration of the assist apparatus 100 according to the second embodiment may be the same as that of the assist apparatus 100 according to the first embodiment, and description thereof is thus omitted.

That is, the driving assist apparatus 100 according to the second embodiment determines that the specific condition is satisfied when all of the following condition (2a) to condition (2e) are satisfied, and then executes the notification control. The specific condition in the second embodiment is also referred to as "second specific condition" for the convenience of description.

(2a) The own vehicle and the communication vehicle are close to each other.

(2b) The opposite direction of the travel direction of the own vehicle and the travel direction of the communication vehicle are close to each other.

(2c) The shape (outer peripheral shape of a portion for displaying the content of the sign) of the own-vehicle-detected sign and the shape of the another-vehicle-detected sign are the same as or similar to each other.

(2d) The position of the own-vehicle-detected sign and the position of the another-vehicle-detected sign are close to each other.

(2e) The height of the own-vehicle-detected sign and the height of the another-vehicle-detected sign are close to each other.

More specifically, the driving assist ECU 101 obtains the distance between the own vehicle and the communication vehicle through the same method as that in the first embodiment. After that, the driving assist ECU 101 determines whether or not the distance between the own vehicle and the communication vehicle is equal to or shorter than a sixth threshold value. That is, the driving assist ECU 101 determines whether or not the condition (2a) is satisfied.

Further, the driving assist ECU 101 determines whether or not the communication vehicle is traveling at a position close to the own vehicle toward a direction close to the opposite direction of the travel direction of the own vehicle. Specifically, the driving assist ECU 101 uses the same method as that in the first embodiment to calculate the magnitude of the difference in the angle (that is, the travel direction difference) formed between the traveling direction of the own vehicle and the traveling direction of the communication vehicle, and determines whether or not this traveling direction difference is within "a predetermined range of from a value obtained by subtracting a seventh threshold value α7 from 180° to a value obtained by adding the seventh threshold value α7 to 180°." That is, the driving assist ECU 101 determines whether or not the condition (2b) is satisfied.

After that, when the driving assist ECU 101 determines that the distance between the own vehicle and the communication vehicle is equal to or shorter than the sixth threshold value and the travel direction difference between the own vehicle and the communication vehicle is within the above-mentioned predetermined range, the driving assist ECU 101 determines that the communication vehicle is traveling at a position close to the own vehicle "toward a direction close to the opposite direction of the travel direction of the own vehicle." The driving assist ECU 101 repeats this determination each time a predetermined period elapses.

In addition, when the image processing ECU 104 of the own vehicle detects an own-vehicle-detected sign, and the image processing ECU 104 of the communication vehicle detects an another-vehicle-detected sign, the driving assist ECU 101 of the own vehicle determines whether or not the shape (outer shape) of the own-vehicle-detected sign and the shape (outer shape) of the another-vehicle-detected sign are the same as or similar to each other. That is, the driving assist ECU 101 determines whether or not the condition (2c) is satisfied.

To the determination of whether or not the shape of the own-vehicle-detected sign and the shape of the another-vehicle-detected sign are the same as or similar to each other, a method of publicly-known image processing can be applied. For example, the driving assist ECU 101 calculates a degree of similarity between the shape of the own-vehicle-detected sign and the shape of the another-vehicle-detected sign, and determines that the shape of the own-vehicle-detected sign and the shape of the another-vehicle-detected sign are the same as or similar to each other when the value of the degree of similarity is equal to or larger than a predetermined threshold value.

Further, in this case, the driving assist ECU 101 determines whether or not the position of the own-vehicle-detected sign and the position of the another-vehicle-detected sign are close to each other. That is, the driving assist ECU 101 determines whether or not the condition (2d) is satisfied.

The method of determining whether or not the position of the own-vehicle-detected sign and the position of the another-vehicle-detected sign are close to each other is the same method as that in the first embodiment. That is, the driving assist ECU 101 obtains the distance between the own-vehicle-detected sign and the another-vehicle-detected sign, and determines whether or not the distance is equal to or shorter than an eighth threshold value. When the distance is equal to or shorter than the eighth threshold value, the driving assist ECU 101 determines that the position of the own-vehicle-detected sign and the position of the another-vehicle-detected sign are close to each other.

After that, when the driving assist ECU 101 determines that the shape of the own-vehicle-detected sign and the shape of the another-vehicle-detected sign are the same as or similar to each other, and the position of the own-vehicle-detected sign and the position of the another-vehicle-detected sign are close to each other, the driving assist ECU 101 determines that the own-vehicle-detected sign and the another-vehicle-detected sign are the same object. In the second embodiment, the own vehicle and the communication vehicle detect the same road sign from directions opposite to each other, and hence one of the own vehicle and the communication vehicle cannot detect the content of the road sign, which is different from the first embodiment. To deal with this problem, in the second embodiment, the information on the shape (outer peripheral shape or outer shape) of the detected road sign is included in the specific object information that is mutually received and transmitted through the vehicle-to-vehicle communication.

Moreover, also in the second embodiment, even when the own-vehicle-detected sign and the another-vehicle-detected sign are the same object, the timing at which the own-vehicle-detected sign is detected by the own vehicle and the timing at which the another-vehicle-detected sign is detected by the communication vehicle may be different from each other. To deal with this problem, also in the second embodiment, the driving assist ECU 101 stores, in the RAM for a predetermined period, the position of the own vehicle measured by the GNSS apparatus 102 of the assist apparatus 100 of the own vehicle, the shape and the position of the road sign calculated by the image processing ECU 104 of the assist apparatus 100 of the own vehicle, and the communication information acquired through the vehicle-to-vehicle communication. After that, even in a case in which the timing at which the road sign is detected by the own vehicle and the timing at which the road sign is detected by the communication vehicle are different from each other, when the difference between the timings is equal to or smaller than a threshold value, the driving assist ECU 101 determines whether or not the own-vehicle-detected sign and the another-vehicle-detected sign are the same object.

In addition, the driving assist ECU 101 determines whether or not the height of the own-vehicle-detected sign and the height of the another-vehicle-detected sign are close to each other. That is, the driving assist ECU 101 determines whether or not the condition (2e) is satisfied. This determination method is the same method as that in the first embodiment.

When the driving assist ECU 101 makes such a determination to determine that the specific condition (all of the condition (2a) to the condition (2e)) is satisfied, the driving assist ECU 101 determines that the own vehicle and the communication vehicle close to the own vehicle are traveling on the same road (in a lane in which the own vehicle is traveling and a lane opposed to the lane of the own vehicle) toward the directions opposite to each other, and executes the notification control. As a result, it is possible to notify the driver of the existence of the another vehicle that may collide with the own vehicle (another vehicle that is close to the own vehicle and is traveling on the same road as the road of the own vehicle toward the direction opposite to the direction of the own vehicle). Meanwhile, the driving assist ECU 101 does not execute the notification control when the driving assist ECU 101 determines that the own vehicle and the communication vehicle are not traveling on the same road toward the directions opposite to each other.

According to the collision avoidance assist control in the second embodiment, it is possible to increase accuracy of the determination of the existence of "another vehicle that is close to the own vehicle and is traveling toward a direction close to the opposite direction of the traveling direction of the own vehicle." As a result, as in the first embodiment, it is possible to reduce the frequency of the execution of the notification control even when the possibility of the collision with the communication vehicle is none or low.

Description is now given of a specific operation of the driving assist ECU 101. As in the first embodiment, the CPU in the second embodiment searches for another vehicle that exists around the own vehicle and is capable of executing the vehicle-to-vehicle communication. When the CPU detects another vehicle capable of executing the vehicle-to-vehicle communication, the CPU establishes the vehicle-to-vehicle communication to/from the another vehicle. When the vehicle-to-vehicle communication is established between the own vehicle and the another vehicle, the CPU repeats a routine represented by a flowchart of FIG. 3.

In Step S201, the CPU determines whether or not a communication vehicle exists close to the own vehicle, and the communication vehicle is traveling toward a direction close to the opposite direction of the travel direction of the own vehicle. Specifically, the CPU determines whether or not the distance between the own vehicle and the communication vehicle is equal to or shorter than the sixth threshold value and whether or not the traveling direction difference between the traveling direction of the own vehicle and the traveling direction of the communication vehicle is within a predetermined allowable range. The predetermined allowable range is a range of between "180°±(seventh threshold value being smaller than 90°)" (range of from the value obtained by subtracting the seventh threshold value from 180° to the value obtained by adding the seventh threshold value to 180°). The predetermined allowable range may be a range of "from a value obtained by subtracting a threshold value 'α' from 180° to a value obtained by adding a threshold value 'β', which is different from the threshold value 'α', to 180°." Both of the threshold value "α" and the threshold value "β" are positive angles smaller than 90°, and are, for example, 10°. When the distance is longer than the sixth threshold value, the CPU determines that the own vehicle and the communication vehicle are not close to each other. When the travel direction difference is not within the predetermined allowable range, the CPU determines that the travel direction of the communication vehicle is not a direction close to the opposite direction of the travel direction of the own vehicle. When the CPU obtains at least one of those determination results, the CPU proceeds to Step S202. In Step S202, the CPU determines that "the communication vehicle is not traveling on the same road as the road of the own vehicle toward the opposite direction of the direction of the own vehicle." After that, the CPU temporarily finishes this routine. Thus, in this case, the notification control is not executed.

When the CPU determines in Step S201 that the distance between the own vehicle and the communication vehicle is equal to or shorter than the sixth threshold value, and the travel direction difference between the own vehicle and the communication vehicle is within the predetermined allowable range, the CPU proceeds to Step S203.

In Step S203, the CPU determines whether or not the own vehicle has detected a road sign (own-vehicle-detected sign), and whether or not the specific object information is acquired from the communication vehicle (that is, whether or not the communication vehicle has detected an another-vehicle-detected sign being a road sign). When at least one of the own vehicle or the communication vehicle has not detected a road sign, the CPU proceeds to Step S202. Meanwhile, when both of the own vehicle and the communication vehicle have detected road signs, the CPU proceeds to Step S204. The timing at which the own vehicle detects the road sign and the timing at which the communication vehicle detects the road sign may be different from each other. Accordingly, also when a time difference between those timings is equal to or smaller than a threshold value, the CPU determines that both of the own vehicle and the communication vehicle have detected the road signs, and proceeds to Step S204. Meanwhile, when the time difference between those timings is longer than the threshold value, the CPU proceeds to Step S202.

In Step S204, the CPU calculates the position of the own-vehicle-detected sign and the position of the another-vehicle-detected sign, and calculates the distance between the own-vehicle-detected sign and the another-vehicle-detected sign based on the calculation result of the positions. Those calculation methods are the same as those in the first embodiment. After that, the CPU proceeds to Step S205.

In Step S205, the CPU determines whether or not the shape of the own-vehicle-detected sign and the shape of the another-vehicle-detected sign are the same as or similar to each other. When the shape of the own-vehicle-detected sign and the shape of the another-vehicle-detected sign are not the same as or similar to each other, the CPU makes a determination of "No" in Step S205, and proceeds to Step S202. When the shape of the own-vehicle-detected sign and the shape of the another-vehicle-detected sign are the same as or similar to each other, the CPU makes a determination of "Yes" in Step S205, and proceeds to Step S206.

In Step S206, the CPU determines whether or not the position of the own-vehicle-detected sign and the position of the another-vehicle-detected sign calculated in Step S204 are close to each other. That is, the CPU determines whether or not the distance between the own-vehicle-detected sign and the another-vehicle-detected sign is equal to or shorter than the eighth threshold value. When the distance is longer than the predetermined eighth threshold value, there is a high possibility that the own-vehicle-detected sign and the another-vehicle-detected sign are not the same object, and the CPU thus makes a determination of "No" in Step S206, and proceeds to Step S202. Meanwhile, when the distance is equal to or shorter than the eighth threshold value, the CPU makes a determination of "Yes" in Step S206, and proceeds to Step S207. That is, when the shape of the own-vehicle-detected sign and the shape of the another-vehicle-detected sign are the same as or similar to each other, and the distance between the own-vehicle-detected sign and the another-vehicle-detected sign is equal to or shorter than the eighth threshold value, the CPU determines that the own-vehicle-detected sign and the another-vehicle-detected sign are the same object.

In Step S207, the CPU determines whether or not the height of the own-vehicle-detected sign and the height of the another-vehicle-detected sign are close to each other. This determination method is the same method as that in the first embodiment. Specifically, the CPU determines whether or not the magnitude of the difference in height (height difference) therebetween is equal to or smaller than the ninth threshold value. After that, when the difference in height is larger than the ninth threshold value, the CPU makes a determination of "No" in Step S207, and proceeds to Step S202. Meanwhile, when the height difference is equal to or smaller than the ninth threshold value, the height of the own-vehicle-detected sign and the height of the another-vehicle-detected sign are close to each other, and hence the CPU makes a determination of "Yes" in Step S207, and proceeds to Step S208.

In Step S208, the CPU determines that the own vehicle and "the communication vehicle existing at the position close to the own vehicle" are traveling on the same road toward the directions opposite to each other, and sets the value of a second flag to "1" so as to indicate this state. That is, the CPU determines that the specific condition indicating that the possibility of collision between the own vehicle and the communication vehicle exists is satisfied. After that, the CPU proceeds to Step S209, and executes the notification control. That is, in Step S209, the CPU notifies that there exists the possibility of the collision with "the another vehicle that is traveling in the opposite lane of the same road as the road of the own vehicle toward the opposite direction of the direction of the own vehicle, and exists around the own vehicle."

Third Embodiment

The assist apparatus 100 according to a third embodiment of the present invention is configured to determine whether or not there exists another vehicle approaching the same intersection as the intersection that the own vehicle is approaching, and determines, when another approaching vehicle exists, that "the specific condition indicating that the possibility of collision between the own vehicle and the another vehicle exists" is satisfied.

That is, the driving assist apparatus 100 according to the third embodiment determines that the specific condition is satisfied when all of the following condition (3a) and condition (3b) are satisfied, and then executes the notification control. The specific condition in the third embodiment is also referred to as "third specific condition" for the convenience of description.

(3a) The own-vehicle-detected sign is a road sign on which the name of an intersection is written, and the another-vehicle-detected sign is a road sign on which the name of an intersection is written.

(3b) The name of the intersection written on the road sign being the own-vehicle-detected sign matches the name of the intersection written on the road sign being the another-vehicle-detected sign.

The configuration of the assist apparatus 100 according to the third embodiment is only required to be the same as that of the assist apparatus 100 according to the first embodiment, and description thereof is thus omitted. The assist apparatus 100 according to the third embodiment is not required to include the GNSS apparatus.

The image processing ECU 104 applies publicly-known image processing to the image taken by the front camera 103, to thereby detect "a road sign (signboard) on which the name of an intersection" included in the image is written. Further, the image processing ECU 104 recognizes "the name of the intersection" written on "the road sign on which the name of the intersection is written." For the recognition of the name of the intersection, a publicly-known OCR method can be used. After that, when "the name of the intersection" is recognized by the image processing ECU 104, the driving assist ECU 101 transmits the recognized "name of the intersection" to the another vehicle through the vehicle-to-vehicle communication. That is, in the third embodiment, the communication information (specific object information) that is mutually transmitted and received through the vehicle-to-vehicle communication includes "the name of the intersection" recognized by the image processing ECU 104. After that, when the image processing ECU 104 of the assist apparatus 100 of the communication vehicle detects "the sign on which the name of the intersection is written," and recognizes "the name of the intersection," the driving assist ECU 101 of the assist apparatus 100 of the own vehicle acquires "the name of the intersection" recognized by the communication vehicle through the vehicle-to-vehicle communication.

When "the name of the intersection" is recognized by the image processing ECU 104 of the own vehicle and "the name of the intersection" recognized by the communication vehicle is acquired through the vehicle-to-vehicle communication, the driving assist ECU 101 determines whether or not the names of the intersections match each other. After that, when the name of the intersection recognized by the own vehicle and the name of the intersection recognized by the communication vehicle match each other, the driving assist ECU 101 determines that the own vehicle and the communication vehicle are approaching the same intersection. That is, the driving assist ECU 101 determines that the specific condition is satisfied. After that, the driving assist ECU 101 executes the notification control.

According to the collision avoidance assist control described above, for example, when the own vehicle and the communication vehicle are traveling on different levels of a grade separation, it is possible to avoid the determination that the possibility of collision between the own vehicle and the communication vehicle exists. For example, with a method of determining whether or not the own vehicle and the communication vehicle are approaching the same intersection through use of the measurement result of the position of the vehicle obtained by the GNSS apparatus, and the accuracy of the measurement of the altitude of the vehicle by the GNSS apparatus is low, there is a fear in that it may be determined that the collision may occur even when the own vehicle and the communication vehicle are traveling on different levels of a grade separation and the possibility of the collision is thus none. In contrast, according to the third embodiment, such an erroneous determination is prevented.

According to the third embodiment, it is possible to determine whether or not the own vehicle and the communication vehicle are approaching the same intersection in accordance with whether or not the recognized "names of the intersections" match each other, and it is not thus required to determine whether or not the own vehicle and the communication vehicle are traveling at positions close to each other, as in the first embodiment. Also in the third embodiment, the determination of whether or not the own vehicle and the communication vehicle are traveling at positions close to each other may be made as in the first embodiment. Further, when the travel direction of the own vehicle and the travel direction of the communication vehicle are greatly different from each other, there is an extremely high possibility that road signs to be detected are not the same object. As a result, it is also not required to determine whether or not the detected road signs are the same objects, which is required in the first embodiment and the second embodiment.

However, the timings at which the road signs are detected may not always be the same between the own vehicle and the communication vehicle, and hence the name of the intersection identified by the image processing ECU 104 of the own vehicle and the name of the intersection acquired through the vehicle-to-vehicle communication are stored in the RAM for a predetermined period as in the first embodiment and the second embodiment.

Description is now given of a specific operation of the driving assist ECU 101. As in the first embodiment, the CPU in the third embodiment searches for another vehicle that exists around the own vehicle and is capable of executing the vehicle-to-vehicle communication. When the CPU detects another vehicle capable of executing the vehicle-to-vehicle communication, the CPU establishes the vehicle-to-vehicle communication to/from the another vehicle. When the vehicle-to-vehicle communication is established between the own vehicle and the another vehicle, the CPU repeats a routine represented by a flowchart of FIG. 4.

In Step S301, the CPU determines whether or not the own vehicle has detected "a sign on which the name of an intersection is written" and has acquired the information on "the name of an intersection" from the communication vehicle. In at least one of the case in which the own vehicle has not detected "a sign on which the name of an intersection is written" or the case in which the own vehicle has not acquired the information on "the name of an intersection" from the communication vehicle, the CPU makes a determination of "No" in Step S301, and proceeds to Step S302. In Step S302, the CPU determines that the own vehicle and the communication vehicle are not approaching the same intersection. After that, the CPU temporarily finishes this routine. Thus, in this case, the notification control is not executed.

When "a road sign on which the name of an intersection is written" is detected and "the name of the intersection" written on the road sign is recognized by the image processing ECU 104 of the own vehicle, and the information on "the name of an intersection" is acquired from the communication vehicle, the CPU proceeds to Step S303. Even in a case in which the timing of the detection of "the sign on which the name of the intersection is written" of the own vehicle and that of the communication vehicle are different from each other, when the time difference between those timings is equal to or smaller than a threshold value, the CPU proceeds to Step S303.

In Step S303, the CPU determines whether or not the name of the intersection written on the own-vehicle-detected sign and the name of the intersection written on the another-vehicle-detected sign match each other. When the names of the intersections do not match each other, the CPU proceeds to Step S302. When the names match each other, the CPU proceeds to Step S304.

In Step S304, the CPU determines that the own vehicle and the communication vehicle are approaching the same intersection, and sets the value of a third flag to "1" so as to indicate this state. That is, the CPU determines that the specific condition indicating that the possibility of collision between the own vehicle and the communication vehicle in the same intersection exists is satisfied. After that, the CPU proceeds to Step S305, and executes the notification control. That is, in Step S305, the CPU notifies that "there is a possibility of the collision with the another vehicle in the intersection that the own vehicle is entering."

Figure 2:
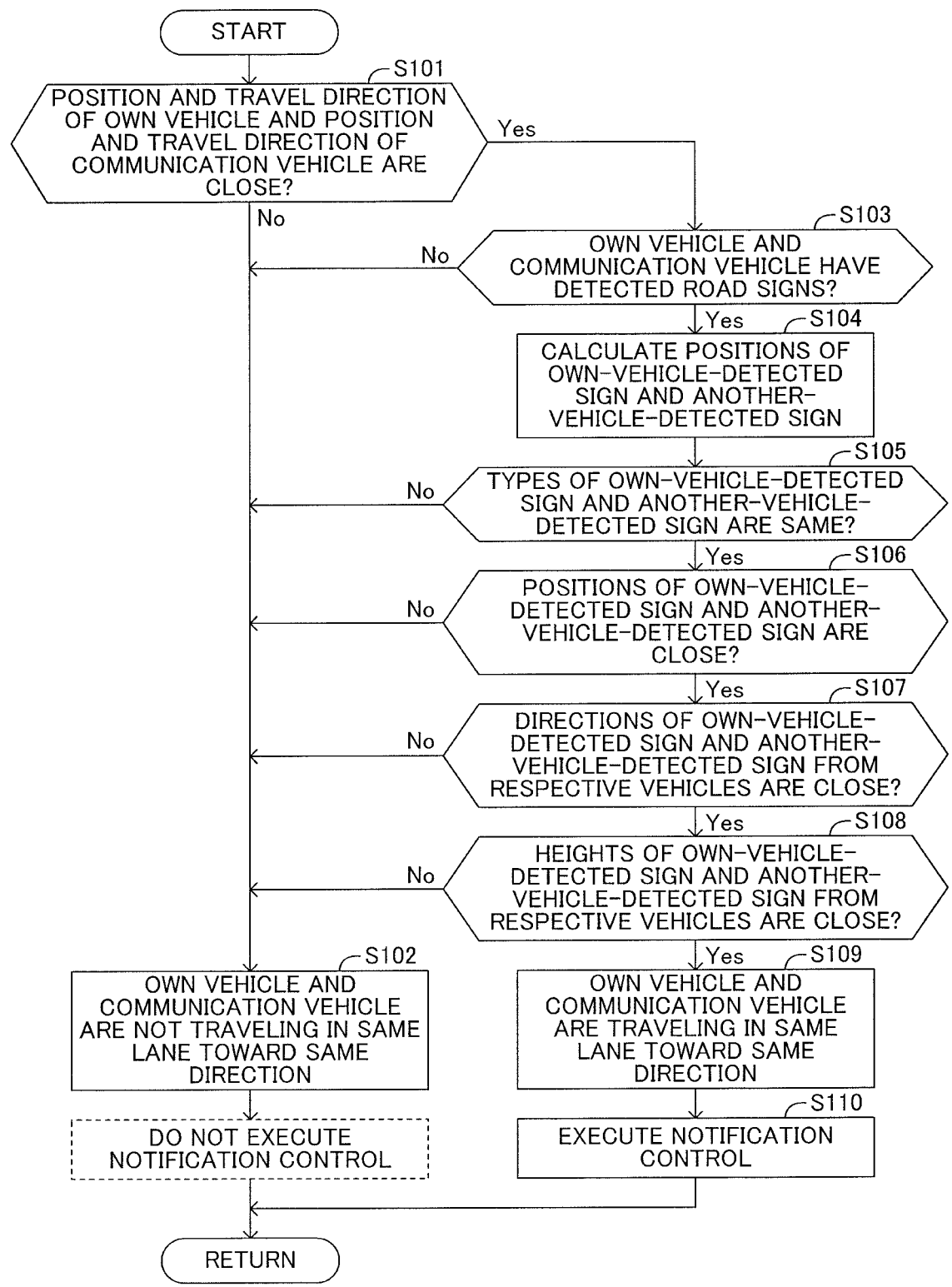
FIG. 2 is a flowchart for illustrating a routine executed by a CPU.
Figure 3:
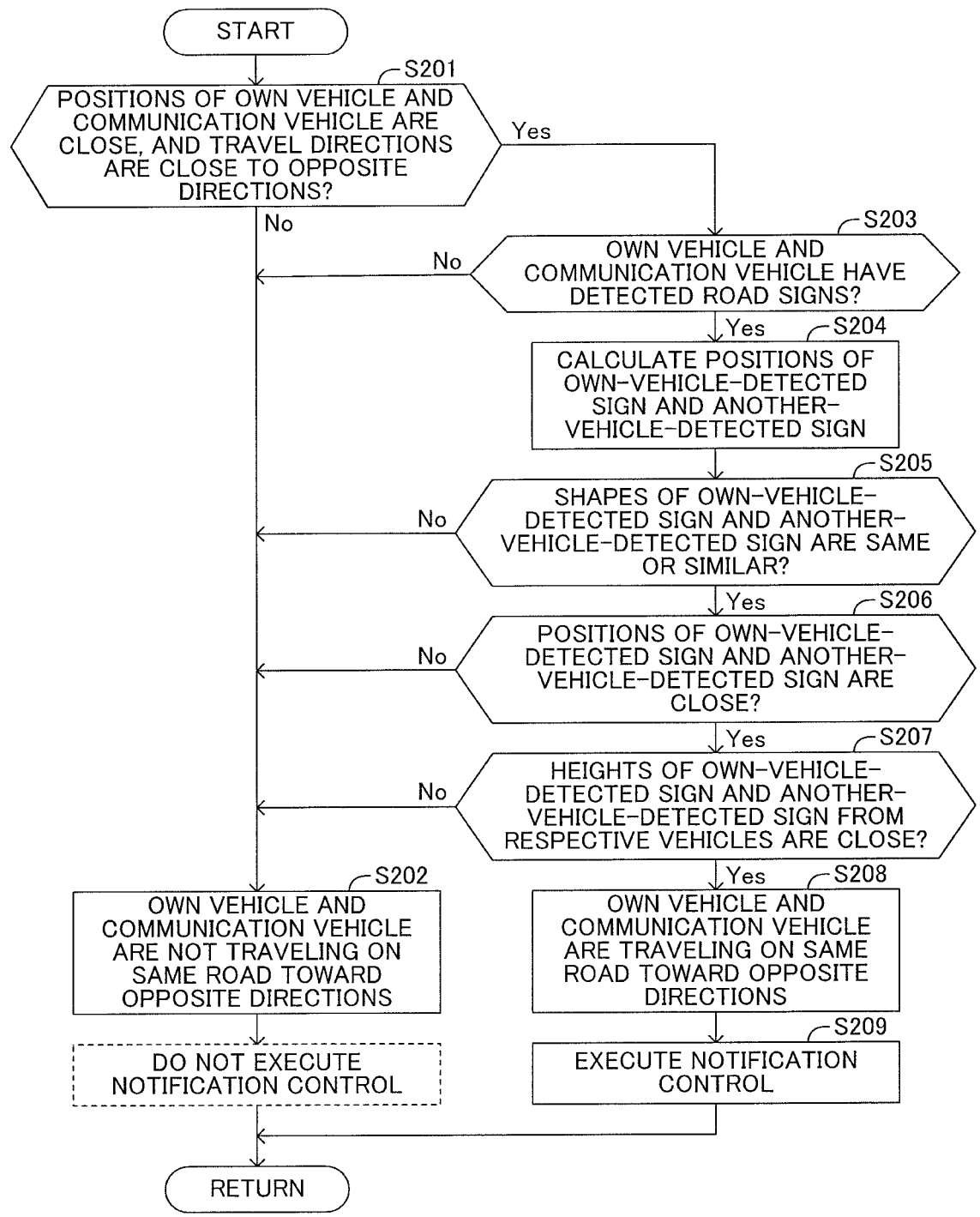
FIG. 3 is a flowchart for illustrating a routine executed by the CPU.
Figure 4:
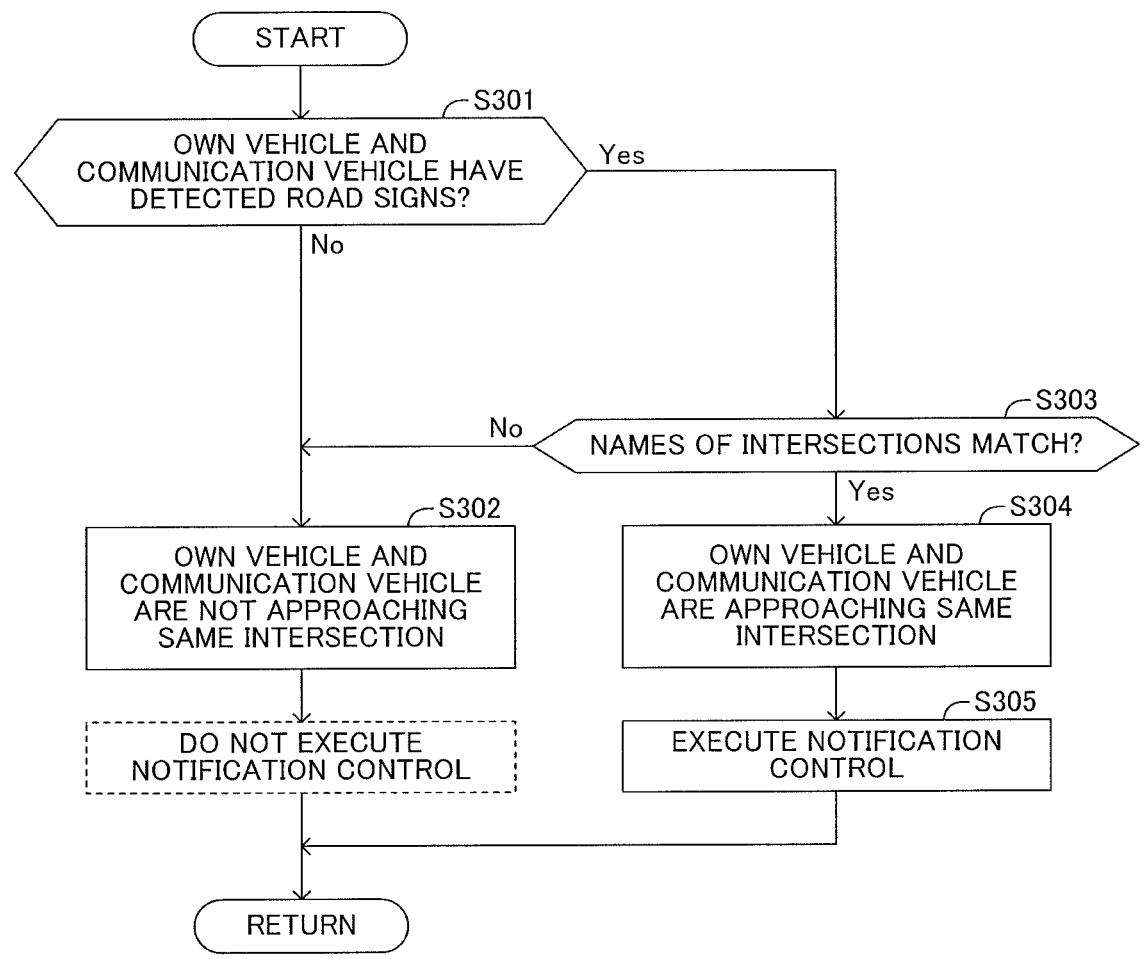
FIG. 4 is a flowchart for illustrating a routine executed by the CPU.

When the CPU in each embodiment establishes the vehicle-to-vehicle communication between the own vehicle and the another vehicle, the CPU may first calculate the travel direction difference between the own vehicle and the another vehicle, 1. when the travel direction difference corresponds to the case in which the travel direction of the another vehicle and the travel direction of the own vehicle are similar to each other in the same direction (for example, the travel direction difference is within a range of from 0° to 15°), the CPU may execute the routine of FIG. 2, 2. when the travel direction difference corresponds to the case in which the travel direction of the another vehicle is similar to the opposite direction of the travel direction of the own vehicle (for example, the travel direction difference is within a range of from 165° to 195°), the CPU may execute the routine of FIG. 3, and 3. when the travel direction difference is close to the orthogonal angle (for example, from 75° to 105°), the CPU may execute the routine of FIG. 4.

The embodiments of the present invention are described above. However, the present invention is not limited to the above-mentioned embodiments.

For example, in the embodiments, the road signs are mentioned as the specific objects to be detected and recognized by the image processing ECU 104, but the specific objects are not limited to the road signs. For example, the specific objects may include landmarks such as a signboard for indicating an installed position of a fire hydrant, a signboard for indicating construction in process, and an advertisement signboard.

Further, in each of the embodiments, the driving assist ECU 101 executes the notification control when "the specific condition indicating that the possibility of collision between the own vehicle and the another vehicle exists" is satisfied, but collision avoidance assist control other than the notification control may be executed when the specific condition is satisfied. For example, when the specific condition is satisfied, the driving assist ECU 101 may execute vehicle control of intervening in a driving operation for the vehicle in order to avoid collision between the own vehicle and the communication vehicle. More specifically, in order to increase the distance between the own vehicle and the communication vehicle, the driving assist ECU 101 may execute vehicle control (approach avoidance control for avoiding abnormal approach of the own vehicle to another vehicle) of decelerating the own vehicle by applying a braking force to the own vehicle thorough use of a braking apparatus of the own vehicle, or vehicle control of accelerating the own vehicle by increasing a driving force of the own vehicle thorough use of a driving apparatus of the own vehicle. Further, when the specific condition is satisfied, the driving assist ECU 101 may use a steering apparatus of the own vehicle to change angles of steered wheels of the own vehicle, to thereby change the travel direction of the own vehicle.

The specific values of the first threshold value to the ninth threshold value and the threshold values for the differences in timing between the detection of the own-vehicle-detected sign and the detection of the another-vehicle-detected sign are not limited, and are appropriately set.

What is claimed is:

1. A safe driving assist apparatus for a vehicle, comprising:
    a camera, which is mounted to an own vehicle, and is configured to acquire an image obtained by taking a forward view of the own vehicle;
    a wireless communication apparatus, which is mounted to the own vehicle, and is configured to transmit and receive information through vehicle-to-vehicle communication;
    a notification apparatus, which is mounted to the own vehicle, and is configured to generate a warning to an occupant of the own vehicle; and
    a control unit, which is mounted to the own vehicle, and is connected to the camera, the wireless communication apparatus, and the notification apparatus,
    wherein the control unit is configured to:
        detect, based on the image, a specific object which is defined in advance and is positioned forward of the own vehicle, and acquire specific object information being information on the specific object;
        transmit, through the wireless communication apparatus, predetermined communication information including the acquired specific object information to another vehicle in a vicinity of the own vehicle, and receive the predetermined communication information transmitted from the wireless communication apparatus of the safe driving assist apparatus for a vehicle mounted to the another vehicle in the vicinity of the own vehicle;
        determine whether a specific condition is satisfied based on the specific object information acquired based on the image and on the specific object information included in the received predetermined communication information, the specific condition being defined in advance to be satisfied when another vehicle requiring attention of the occupant of the own vehicle exists; and
        generate the warning from the notification apparatus when the control unit determines that the specific condition is satisfied.

2. The safe driving assist apparatus for a vehicle according to claim 1, wherein the control unit is configured to acquire, as the specific object information, information on a road sign being the specific object.

3. The safe driving assist apparatus for a vehicle according to claim 2,
    wherein the control unit is configured to:
        acquire a position of the own vehicle based on radio wave signals from positioning satellites; and
        transmit, as the predetermined communication information, information including the acquired position of the own vehicle, and
    wherein the control unit is further configured to determine, based on the acquired position of the own vehicle, the acquired information on the road sign, and the received predetermined communication information, that the specific condition is satisfied when the control unit determines that the following condition is satisfied:
        a distance between the own vehicle and the another vehicle is equal to or shorter than a first threshold value;
        a travel direction difference is equal to or smaller than a second threshold value, the travel direction difference being a magnitude of a difference in an angle formed between a travel direction of the own vehicle and a travel direction of the another vehicle; and
        an own-vehicle-recognized sign and an another-vehicle-recognized sign are the same, the own-vehicle-recognized sign being a road sign included in the image acquired by the camera mounted to the own vehicle, the another-vehicle-recognized sign being a road sign included in the image acquired by the camera mounted to the another vehicle.

4. The safe driving assist apparatus for a vehicle according to claim 3, wherein the control unit is configured to:
    determine that the own-vehicle-recognized sign and the another-vehicle-recognized sign are the same when the control unit determines that:
        a type of the own-vehicle-recognized sign and a type of the another-vehicle-recognized sign are the same; and
        a distance between the own-vehicle-recognized sign and the another-vehicle-recognized sign is equal to or shorter than a third threshold value; and
    determine, in a case in which the control unit determines that the own-vehicle-recognized sign and the another-vehicle-recognized sign are the same, that the specific condition is satisfied when the control unit further determines that one of the following conditions are satisfied:
        a condition that a detection direction difference is equal to or smaller than a fourth threshold value, the detection direction difference being a magnitude of a difference in an angle formed between a direction of the own-vehicle-recognized sign with respect to the own vehicle and a direction of the another-vehicle-recognized sign with respect to the another vehicle; and
        a condition that the own-vehicle-recognized sign is located on any one side of a left side and a right side with respect to the travel direction of the own vehicle and the another-vehicle-recognized sign is located on any one side of a left side and a right side with respect to the travel direction of the another vehicle.

5. The safe driving assist apparatus for a vehicle according to claim 4, wherein the control unit is configured to:
   determine, in the case in which the control unit determines that the own-vehicle-recognized sign and the another-vehicle-recognized sign are the same, that the specific condition is satisfied when the control unit further determines that a magnitude of a difference between a height of the own-vehicle-recognized sign and a height of the another-vehicle-recognized sign is equal to or smaller than a fifth threshold value; and
   determine, even in the case in which the control unit determines that the own-vehicle-recognized sign and the another-vehicle-recognized sign are the same, that the specific condition is not satisfied when the control unit determines that the magnitude of the difference between the height of the own-vehicle-recognized sign and the height of the another-vehicle-recognized sign is larger than the fifth threshold value.

6. The safe driving assist apparatus for a vehicle according to claim 2,
   wherein the control unit is configured to:
      acquire a position of the own vehicle based on radio wave signals from positioning satellites; and
      transmit, as the predetermined communication information, information including the acquired position of the own vehicle, and
   wherein the control unit is further configured to determine, based on the acquired position of the own vehicle, the acquired information on the road sign, and the received predetermined communication information, that the specific condition is satisfied when the control unit determines that the following condition is satisfied:
      a distance between the own vehicle and the another vehicle is equal to or shorter than a sixth threshold value;
      a travel direction difference is within a predetermined angle range including 180°, the travel direction difference being a magnitude of a difference in an angle formed between a travel direction of the own vehicle and a travel direction of the another vehicle; and
      an own-vehicle-recognized sign and an another-vehicle-recognized sign are the same, the own-vehicle-recognized sign being a road sign included in the image acquired by the camera mounted to the own vehicle, the another-vehicle-recognized sign being a road sign included in the image acquired by the camera mounted to the another vehicle.

7. The safe driving assist apparatus for a vehicle according to claim 6, wherein the control unit is configured to:
   determine that the own-vehicle-recognized sign and the another-vehicle-recognized sign are the same when the control unit determines that:
      an outer peripheral shape of the own-vehicle-recognized sign and an outer peripheral shape of the another-vehicle-recognized sign are the same; and
      a distance between the own-vehicle-recognized sign and the another-vehicle-recognized sign is equal to or shorter than an eighth threshold value; and
   determine, in a case in which the control unit determines that the own-vehicle-recognized sign and the another-vehicle-recognized sign are the same, that the specific condition is satisfied when the control unit further determines that the following condition is satisfied: a magnitude of a difference between a height of the own-vehicle-recognized sign and a height of the another-vehicle-recognized sign is equal to or smaller than a ninth threshold value.

8. The safe driving assist apparatus for a vehicle according to claim 2,
   wherein the control unit is configured to acquire, as the information on the road sign, a name of an intersection written on the road sign from the image taken by the camera mounted to the own vehicle, and
   wherein the control unit is further configured to determine that the specific condition is satisfied when the control unit determines that the following condition is satisfied: the acquired name of the intersection and a name of an intersection included in the predetermined communication information are the same.

* * * * *